United States Patent [19]

Evans et al.

[11] Patent Number: 4,529,774

[45] Date of Patent: Jul. 16, 1985

[54] TREATED SILICA FILLERS AND PROCESS FOR MAKING SAME

[75] Inventors: Edwin R. Evans; Kevin T. Pate, both of Clifton Park; Jerome E. Rattner, Troy, all of N.Y.; Verne G. Simpson, Rogers, Ark.

[73] Assignee: General Electric Company, Waterford, N.Y.

[21] Appl. No.: 410,004

[22] Filed: Aug. 20, 1982

[51] Int. Cl.$^3$ .......................... C09C 3/12; C08K 9/06; C08L 83/06

[52] U.S. Cl. ................... 524/860; 106/288 B; 106/308 Q; 523/209; 523/213; 556/467

[58] Field of Search .............. 106/288 B, 308 Q; 524/492, 860; 523/209, 212, 213; 556/467

[56] References Cited

U.S. PATENT DOCUMENTS

| | | | |
|---|---|---|---|
| 2,541,137 | 2/1951 | Warrick | 524/588 |
| 2,610,167 | 9/1952 | Grotenhuis | 523/207 |
| 2,657,149 | 10/1953 | Iler | 106/308 Q |
| 2,737,506 | 3/1956 | Hurd et al. | 528/14 |
| 2,938,009 | 5/1960 | Lucas | 523/212 |
| 2,979,519 | 4/1961 | Pierce et al. | 556/460 |
| 3,085,905 | 4/1963 | Prevot et al. | 106/308 Q |
| 3,179,619 | 4/1965 | Brown | 524/860 |
| 3,268,473 | 8/1966 | Brown | 524/493 |
| 3,334,062 | 8/1967 | Brown et al. | 106/308 Q |
| 3,635,743 | 1/1972 | Smith | 106/288 Q |
| 3,847,848 | 11/1974 | Beers | 523/213 |
| 3,937,684 | 2/1976 | Razzano | 528/14 |
| 4,029,629 | 6/1977 | Jeram | 523/203 |
| 4,111,973 | 9/1978 | Bluestein | 556/460 |
| 4,263,051 | 4/1981 | Crawford | 106/308 Q |
| 4,341,888 | 7/1982 | Razzano | 528/14 |
| 4,344,800 | 8/1982 | Lutz | 106/288 B |
| 4,355,121 | 10/1982 | Evans | 204/159.13 |
| 4,360,610 | 11/1982 | Murray et al. | 523/209 |
| 4,395,507 | 7/1983 | Dziark | 523/212 |

FOREIGN PATENT DOCUMENTS

| | | |
|---|---|---|
| 1025837 | 1/1953 | France . |
| 1090566 | 10/1954 | France . |
| WO81/03496 | 12/1981 | PCT Int'l Appl. ............ 106/308 Q |

Primary Examiner—Helen M. McCarthy

[57] ABSTRACT

A treatment for finely divided silica reinforcing fillers is provided which comprises heating the silica filler in the presence of a fluoroalkyl-functional diorganopolysiloxane treating agent. The treated fillers are especially compatible with fluorosilicone gums, and fluorosilicone rubbers made using said fillers exhibit improved mechanical properties, especially tear strength and compression set.

11 Claims, No Drawings

TREATED SILICA FILLERS AND PROCESS FOR MAKING SAME

BACKGROUND OF THE INVENTION

This invention relates to reinforced silicone elastomers. More particularly, it relates to finely divided silica fillers, useful in reinforcing fluorosilicone elastomeric compositions which have been treated with pre-hydrolyzed fluoroalkyl-functional diorganodihalogensilanes. Fluorosilicone elastomers containing silica fillers so treated show substantially improved compression set and tear strength, as well as improved handling properties.

Silicone elastomers have been widely valued for their resistance to moisture and their high and low temperature stability. Improved silicone elastomers have also been developed which exhibit better handling characteristics, as in U.S. Pat. No. 2,938,009 (Lucas), mechanical properties, as in U.S. Pat. Nos. 3,635,743 (Smith) and 3,847,848 (Beers), and solvent resistance, as in U.S. Pat. No. 4,029,629 (Jeram). All of the above patents are incorporated herein by reference. These improvements are accomplished through the use of treated fillers, usually treated finely divided silica, or by modifying the curable siloxane polymers, as with the perfluoroalkylene-substituted polysiloxanes of the aforementioned Jeram patent.

Treating silica fillers with fluorosilicone treating agents has been proposed, see e.g., copending U.S. Applications Ser. No. 252,659 filed Apr. 9, 1981, now U.S. Pat. No. 4,355,121 and Ser. No. 195,579 filed Nov. 8, 1980, now abandoned in favor of Ser. No. 368,931 filed April 16, 1982, but implementation of the concept has been resisted because of the toxicity of the treating agents (i.e., fluoroalkyl functional cyclic polysiloxanes) and the substantial modifications of existing equipment their use would entail.

It has now been discovered that finely divided silica reinforcing fillers can be treated with fluoroalkyl-functional silicone polymers without modifying conventional production apparatus and without adding costly toxicity controls. Furthermore, fluorosilicone elastomers reinforced with these fillers show improved ease of handling in mixing, milling and extrusion and also have improved mechanical properties, especially in terms of tear strength and compression set.

SUMMARY OF THE INVENTION

Accordingly, it is the object of the present invention to provide a treated silica filler for reinforcing vulcanizable elastomers which will improve the handling properties and mechanical properties of silicone elastomers made with said fillers.

It is a further object of the present invention to provide a means of improving the performance of silicone rubbers without entailing significant product process changes or toxicity precautions.

It is a further object of the present invention to provide a process for treating finely divided silica reinforcing fillers with fluoroalkyl-functional diorganopolysiloxane treating agents.

These and other objects are accomplished herein by a process for treating finely divided silica fillers comprising contacting the filler, at a temperature of from 240°–310° C. for 4–16 hours while purging volatiles and water and maintaining a pressure of from 0 to about 15 psig, with a fluoroalkyl-functional diorganopolysiloxane treating agent, such as a hydrolyzate containing fluoroalkyl-functional cyclic polysiloxanes and low molecular weight diorganopolysiloxanes.

Preferred features will include preheating of the filler before contact with the treating agent.

The treated filler and curable fluorosilicone elastmeric compositions containing the fillers are also contemplated herein.

DETAILED DESCRIPTION OF THE INVENTION

The fillers treated by the process of the present invention are finely divided reinforcing fillers which may have free hydroxyl groups in the form of either Si-bonded functional groups or adsorbed moisture, depending on their method of preparation. The Si-bonded hydroxyl groups may also have been converted to other functional groups, such as alkoxy, in their manufacture.

These silica fillers are reinforcing fillers in contrast to other fillers of non-reinforcing, non-structure-forming type, such as titanium dioxide or calcium carbonate. Examples of such silica fillers may be found described in U.S. Pat. Nos. 2,541,137; 2,610,167 and 2,657,149, as well as French Pat Nos. 1,025,837 (issued 1953) and 1,090,566 (issued 1955). Such structure-causing fillers may be slightly acidic or alkaline (i.e., have pH's slightly below or above 7) depending upon the method of manufacture, and may be obtained through the aerosol-aerogel process, by fuming processes such as by the vapor phase burning of silicon tetrachloride or ethyl silicate, by precipitation means, etc. Commercially available fumed silicas include CAB-O-SIL ® (Cabot Corp.) and AEROSIL ® (Degussa, Inc.). Fumed silica is preferred.

The treating agents used in the practice of this invention are fluoroalkyl-functional polysiloxane fluids having a viscosity of from about 50–250 centipoise which may be formed from diorganodihalogensilanes that have been hydrolyzed to form a mixture of cyclics and short diorganopolysiloxane chains. The treating agent will be obtained from diorganodihalogensilanes of the formula $R^1RSiX_2$ and $R^2SiX_2$, wherein R, $R^1$ and $R^2$ are representative of monovalent hydrocarbon radicals and halogenated monovalent hydrocarbon radicals that are well known as attachments to silicon atoms. At least the $R^1$ substituent contains three or more carbon atoms. R is the same as $R^1$ or is methyl, ethyl, vinyl or phenyl. $R^1$ is alkyl, such a propyl, butyl, hexyl, and the like, of from 3 to 8 carbon atoms; halogenated alkyl, such as 3-chloropropyl, 4-chlorobutyl, 3-fluorophenyl, 3,3-difluoropropyl, 3,3,3-trifluoropropyl, and the like of from 3 to 8 carbon atoms, or cycloalkyl of from 4 to 8 carbon atoms, such as cyclopentyl, cylcohexyl, cycloheptyl, and the like. Preferably, $R^1$ is a substituted alkyl group such as, —$CH_2CH_2R^3$, wherein $R^3$ is perfluoroalkyl of from 1 to 6 carbon atoms, such as perfluoromethyl, perfluoroethyl, perfluorohexyl, and the like. Most preferably, $R^1$ is 3,3,3-trifluoropropyl, R is methyl or ethyl, and $R^2$ is methyl or ethyl, the latter two most preferably being methyl. X in the above formulae is halogen, such as chlorine or bromine, and preferably, chlorine. Such diorganodichlorosilanes, at a purity of at least 99% by weight, are added to water at room temperature, e.g., 29°–25° C. to provide from 2 to 10 moles of water per mole of the diorganodihalogensilane. In the most preferred case, after the diorganodihalogensilanes have been added to water, the mixture will contain about 20% by weight HCl. The hydrolysis may optionally be carried out in the presence of a water-immiscible solvent such as, for example, toluene, xylene, benzene, and the like. The use of a solvent facilitates the separation of the hydrolyzate from the aqueous acid solution. Where a water-immiscible organic solvent is used, it is preferably added to the water prior to the addition of the diorganodihalogensilanes. The diorganodihalogensilanes, preferably at 99+% purity, are added to the water during ½ hour to 2 hours with agitation. The hydrolyzate may be neutralized with a mild base, such as sodium bicarbonate. The hydrolyzate product contains mostly cyclic polysiloxanes of from 3 silicon atoms to 10 silicon atoms and low molecular weight linear silanol end-stopped diorganopolysiloxanes. The cyclic polysiloxane entities will have from 3-10 siloxy units, some of the larger ring structures arising from reformation of cyclic monomer starting materials; the linear entities will have varying block lengths, with the average degree of polymerization being about 5. They are typically fluid polymers having a low molecular weight, usually under 1000. See, for example, U.S. Pat. Nos. 2,737,506 (Hurd et al.), 3,937,684 (Razzano) and 4,341,888 (Razzano), all incorporated by reference. The fluoroalkyl-functional diorganopolysiloxanes thus formed are low viscosity fluids which are easier and safer to work with than the cyclic monomers.

To obtain the treated silica fillers of the invention, the filler is heated in the presence of the fluoroalkyl-functional polysiloxane treating agent at a temperature of from 240°-310° C. for 4-16 hours, at 0-15 psig pressure, while removing liberated volatiles (e.g., water, cyclics). Preferably, the silica filler will be contacted with the fluoroalkyl-diorganopolysiloxane treating agent over a temperature range of about 240° to about 260° C. for 4-8 hours at around one atmosphere (~14.7 psig) pressure while removing volatiles, for example, by nitrogen purge. The resultant treated fillers will have a broad particle size distribution (~73 wt. % <500μ; ~60 wt. % >420μ) and surface area over the range of 150-160 m$^2$/gm. When these fillers are used to reinforce fluorosilicone polymer gums at levels, for example, of about 25-35 parts per 100 of the total composition, curable fluorosilicone elastomers result which (when cured) have improved mechanical properties (especially tear strength and compression set). Preparation and handling of the filled compositions is also easier: Mixing of filler with polymer is fast and a good dispersion is obtained; the composition also releases cleanly from metal mixing equipment.

Most preferably, the raw (untreated) silica filler will be preheated in a sealed system for 4-30 hours (more preferably 4-20 hours) at a temperature of 240°-310° C. (preferably about 270° C.), then contacted with the fluoroalkyl-functional diorganopolysiloxane treating agent hydrolyzate while maintaining a sealed, fluidized system, and heated 4-16 hours longer (more preferably 8-10 hours) at 270°-310° C. while maintaining one atmosphere gauge pressure. This results in treated filler with a somewhat narrower particle size distribution (~85 wt. % <500μ; ~70 Wt. % >420μ).

Preheating the silica filler in a closed system is believed to promote a reversible surface condensation which reduces the number of free hydroxyl groups on the surface of the silica particles. The condensation also increases particle size, leading to a loss of surface area (~149-160 m$^2$/gm. as compared to 200-300 m$^2$/gm. in untreated silica). The decreased surface area is believed to provide higher flourine content after treatment.

Prolonged preheating of the filler (e.g., >30 hours) results in particles which are too large, with insufficient hydroxyl functionality available for reaction with the treating agent. Treatment at pressures beyond about 15 psig or in a hydrous environment decreases the layering of fluoroalkyl-functional diorganopolysiloxane treating agent on the particle surface, which is a desirable characteristic of the treatment of the present invention. This decrease is believed to be due to some form of chain stopping.

The treated silica fillers prepared according to the present invention may be used in any heat- or room temperature-curable silicone rubber system or in any manner that finely divided silica fillers are commonly used in the art; but because the treated fillers disclosed herein have shown a compatability with fluorosilicone gums, leading to the unexpected processing improvements already discussed, use in fluorosilicone elastomer compositions, such as disclosed in U.S. Pat. No. 3,179,619 (Brown), U.S. Pat. No. 4,029,629 (Jeram) and U.S. Application Ser. No. 253,282, filed Apr. 9, 1981, now abandoned in favor of Ser. No. 443,545, filed Nov. 22, 1982 (all incorporated by reference), is especially contemplated.

The amount of treated silica filler used in combination with curable (vulcanizable) organopolysiloxane elastomer compositions may be varied within wide limits, for instance, from 10 to 100 weight percent of the filler based on the weight of the curable organopolysiloxane elastomer. The exact amount of filler used will depend on such factors as, for example, the intended application of the cured elastomer composition, the density of the silica filler employed, the type or organopolysiloxane elastomer employed, etc. By way of illustration, when curable fluorosilicone polymer gums are used, reinforcing with about 19-25 weight percent of the treated filler disclosed herein has resulted in marked improvement in tear strength and compression set. Judicious selection of materials and simple experimentation is contemplated to achieve optimal performance for a given situation.

Other fillers may of course be used in conjunction with the treated silica herein. These include, for example, untreated silica filler, titanium dioxide, lithopone, zinc oxide, zirconium silicate, iron oxide, diatomacious earth, finely divided sand, calcium carbonate, etc.

All patents and applications mentioned above are hereby incorporated by reference.

In order that persons skilled in the art may better understand how to practice the present invention, the following examples are offered by way of illustration and not by way of limitation.

EXAMPLES 1-5

Four treated silica filler compounds were prepared as follows:

|  | 1 | 2 | 3 | 4 |
| --- | --- | --- | --- | --- |
|  | COMPOSITION | | | |
| silica filler* (lbs.) | 900 | 900 | 900 | 1000 |
| hydrolyzate** (lbs.) | 220 | 220 | 220 | 250 |
| weight percent charge | 19.6 | 19.6 | 19.6 | 20 |
| preheating at | 20 | 4 | — | — |

-continued

|  | 1 | 2 | 3 | 4 |
|---|---|---|---|---|
| 270° C. (hrs.) treating conditions pressure | >270° C./ 8 hrs. 15 psig | >270° C./ 8 hrs. 15 psig | >270° C./ 8 hrs. 15 psig | 240° C./ 8 hrs. 0 psig |
| PRODUCT | | | | |
| bulk density (gm/cc) | 0.089 | 0.095 | 0.118 | 0.25 |
| weight percent treating agent | 17.32 | 16.84 | 15.89 | — |

*CAB-O-SIL ® MS-7; Cabot Corporation
**hydrolyzed 3,3,3-trifluoropropylmethyldichlorosilane, containing cyclic polysiloxanes and low molecular weight linear silanol end-stopped polysiloxanes A fluorosilicone elastomer composition was prepared from 100 parts by weight fluorosilicone polymer, 3.0 parts by weight of a PDMS diol process aid: HO—(—Si(Me)$_2$O—)$_5$—H, 1.0 parts by weight of a PDMS process aid, 0.25 parts of (Me$_2$ViSi)$_2$NH, 0.65 parts by weight cerium hydroxide, and 0.8 parts by weight of 2,5-dimethyl-2,5-di-t-butylperoxyhexane. Treated filler compounds 1-4 were combined with the fluorosilicone elastomer compositions to make six test compositions. The six samples (designated A-F) were press cured fifteen minutes at 350° F. and post baked four hours at 400° F. to yield fluorosilicone rubbers with the following properties:

|  | A | B | C | D | E | F |
|---|---|---|---|---|---|---|
| TEST COMPOSITIONS | | | | | | |
| filler used | 1 | 1 | 2 | 3 | 4 | 4 |
| filler loading (parts per 100 of polymer) | 34 | 33 | 34 | 34 | 26 | 33 |
| RUBBER PROPERTIES | | | | | | |
| Shore A | 43 | 39 | 41 | 43 | 36 | 46 |
| Tensile Strength (psi) | 1420 | 1205 | 1525 | 1505 | 1696 | 1130 |
| Elongation (%) | 610 | 650 | 620 | 600 | 640 | 520 |
| Tear Strength, Die B (ppi) | 210 | 200 | 180 | 210 | 190 | 170 |
| Bashore | 21 | 20 | 19 | 18 | — | 21 |
| Compression Set, 22 hours at 350° F. | 13.4 | 19.0 | 16.5 | 28.4 | 18.9 | 40.9 |
| Specif. Gravity | 1.424 | 1.417 | 1.422 | 1.426 | — | 1.415 |

Obviously, many variations will suggest themselves to those skilled in this art in light of the above, detailed description. All such modifications are within the intended scope of the appended claims.

We claim:

1. A process for treating finely divided silica reinforcing fillers comprising contacting the filler at a temperature of from 240°-310° C. for 4-16 hours while removing volatiles and water and maintaining 0-15 psig pressure with the hydrolyzate of a fluoroalkyl-functional diorganodihalogensilane, said hydrolyzate comprising a mixture of fluoroalkyl-functional cyclic diorganopolysiloxanes having 3 to 10 siloxy units and silanol end-stopped low molecular weight linear diorganopolysiloxanes.

2. A process as defined in claim 1, wherein said filer is fumed silica and said diorganodihalogensilane is 3,3,3-trifluoropropylmethyldichlorosilane.

3. A process for treating finely divided silica reinforcing fillers comprising contacting the filler at a temperature of 240°-260° C. for 4-8 hours while removing volatiles and water and maintaining atmospheric pressure with the hydrolyzate of a fluoroalkyl-functional diorganodihalogensilane, said hydrolyzate comprising a mixture of fluoroalkyl-functional cyclic diorganopolysiloxanes having 3 to 10 siloxy units and silanol end-stopped low molecular weight linear diorganopolysiloxanes.

4. A process as defined in claim 3 wherein said filler is fumed silica and said diorganodihalogensilane is 3,3,3-trifluoropropylmethyldichlorosilane.

5. A process for treating finely divided silica reinforcing fillers comprising:
   (a) preheating said filler in a closed anhydrous environment at a temperature of from 270°-310° C. for 4-30 hours, maintaining about 1 atmosphere gauge pressure and removing volatiles and water;
   (b) introducing the hydrolyzate of a fluoroalkyl-functional diorganodihalogensilane, said hydrolyzate comprising a mixture of fluoroalkyl-functional cyclic diorganopolysiloxanes having 3 to 10 siloxy units and silanol end-stopped low molecular weight linear diorganopolysiloxanes, while maintaining the closed anhydrous system;
   (c) heating at a temperature of 270°-310° C. for an additional 4-16 hours while removing volatiles and water and maintaining about 1 atmosphere gauge pressure.

6. A process as defined in claim 5, wherein the filler is preheated in step (a) at a temperature of about 270° C.

7. A process as defined in claim 6, wherein the preheating of step (a) is for 4-20 hours and the treating step (c) lasts for 8-10 hours.

8. A process as defined in claim 7, wherein said filler is fumed silica and said diorganodihalogensilane is 3,3,3-trifluoropropylmethyldichlorosilane.

9. A treated finely divided silica reinforcing filler prepared by heating an untreated silica filler in the presence of the hydrolyzate of a fluoroalkyl-functional diorganodihalogensilane, said hydrolyzate comprising a mixture of fluoroalkyl-functional cyclic diorganopolysiloxanes having 3 to 10 siloxy units and silanol end-stopped low molecular weight linear diorganopolysiloxanes, at a temperature of about 240°-310° C. for 4-16 hours while maintaining a closed anhydrous environment at 0-15 psig pressure and removing volatiles and water.

10. The treated silica filler of claim 9, wherein said untreated silica filler is fumed silica and said diorganodihalogensilane is 3,3,3-trifluoropropylmethyldichlorosilane.

11. A vulcanizable fluorosilicone elastomer reinforced with the treated silica filler of claim 9.

* * * * *